Sept. 12, 1967  KENSHO SUEMATSU  3,340,736
DEVICE FOR INDICATING SPECIFIC GRAVITY OF LIQUIDS
Filed Sept. 15, 1964  2 Sheets-Sheet 2
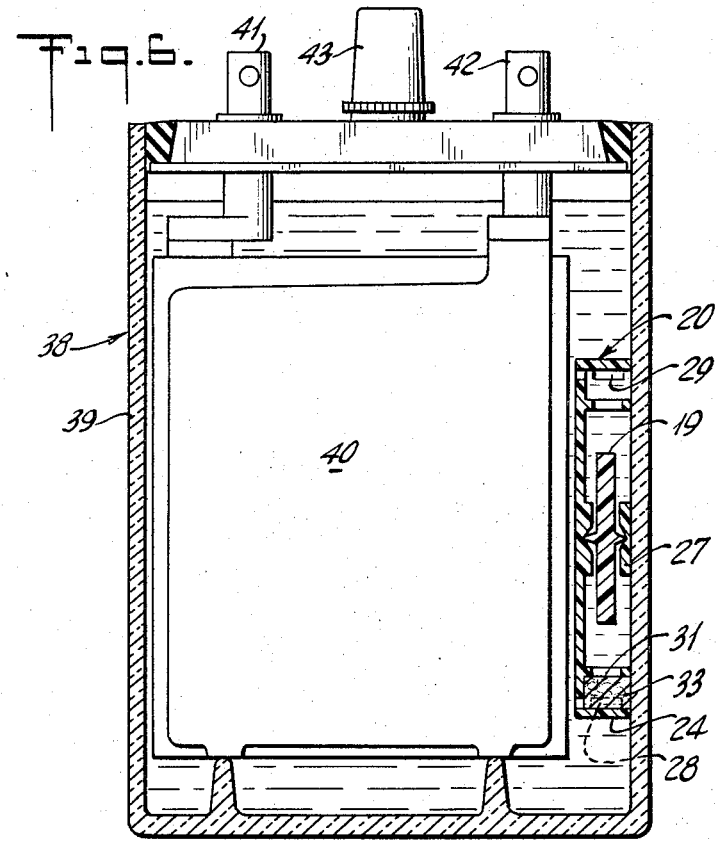
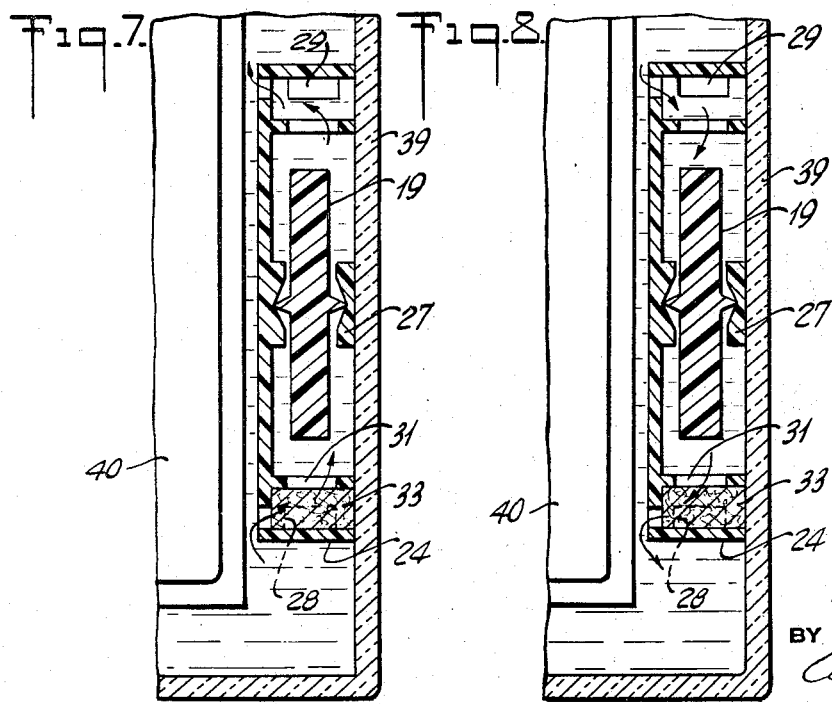
INVENTOR
KENSHO SUEMATSU
BY
ATTORNEY United States Patent Office 3,340,736
Patented Sept. 12, 1967

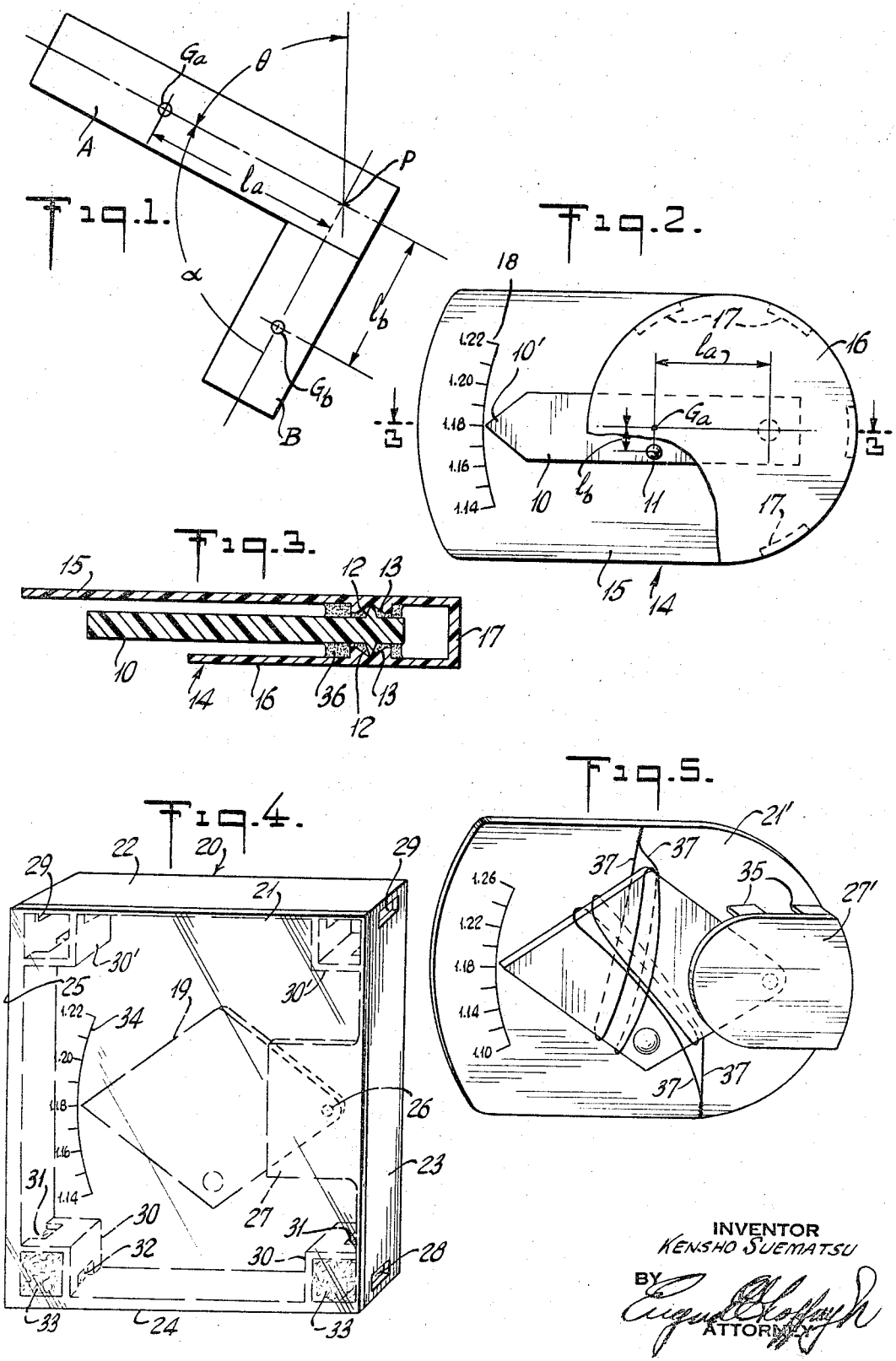

3,340,736
DEVICE FOR INDICATING SPECIFIC
GRAVITY OF LIQUIDS
Kensho Suematsu, Kyoto, Japan, assignor to Nihon
Denchi Kabushiki, Kaisha, Kyoto, Japan, a company of Japan
Filed Sept. 15, 1964, Ser. No. 396,565
1 Claim. (Cl. 73—454)

This invention relates to the measurement of the specific gravity of a liquid and more specifically to a novel and improved device particularly suitable for immersion in the electrolyte of a storage battery to continuously indicate the specific gravity of the electrolyte.

More specifically, the invention concerns an improved device for indicating specific gravity which utilizes a floating body formed of at least two different materials each having a different specific gravity and which materials are joined one to the other and supported for relatively free rotation about a fulcrum when immersed in the electrolyte to be measured. By utilizing a calibrated scale in connection with the rotatable body, a direct measurement of the specific gravity can be obtained. This structure presents a substantial advance over prior devices which have generally utilized a floating body having a predetermined mass and which was confined within a tubular element. One such device is the conventional hydrometer but it is well recognized that such a device is not readily adaptable for continuous indication of specific gravity. Furthermore, when floating elements are utilized, the element tends to adhere to the wall of the tubular container and an accurate measurement of the specific gravity is therefore difficult to attain without constantly manipulating the battery in order to be sure that the floating element is free. Other devices, such as those using spring loaded elements or a device utilizing a pair of tubular members subjected to air pressure are obviously not satisfactory since spring loaded elements are not readily usable in corrosive liquids and the provision of compressed air is a cumbersome and complicated procedure.

Another object of the invention resides in the provision of a novel and improved device for indicating the specific gravity of a liquid which can be installed permanently within the electrolyte and affords a continuous and accurate indication without the need for manipulation of the battery to ensure an accurate reading.

Another object of the invention resides in a novel and improved specific gravity indicator for electrolytes having means for protecting the indicator from vibration and shock in transportation. This is attained by an improved arrangement and coordination of the fixed and rotary elements of the indicator which are necessarily coupled by a precision bearing whereby the two elements are held in fixed relative positions until immersion in the electrolyte. According to the invention, the electrolyte functions to release the rotary element by dissolving the supporting material. In the case of sulphuric acid batteries, for instance, substances such as nylon or a suitable gelatin may be utilized for fixing the rotary and fixed elements one relative to the other, and these materials upon being dissolved in the electrolyte do not adversely affect the operation of the battery.

Still another object of the invention resides in a novel and improved structure to minimize the adhesion of bubbles to the floating indicating device which would otherwise cause indicating errors. This is attained through treatment of the floating body to minimize the adherence of bubbles and the provision of an improved protective housing that minimizes contact of gas bubbles with the floating or movable element.

The above and other objects and advantages of the invention will become more apparent from the following description and accompanying drawings forming part of this application.

In the drawings:

FIGURE 1 is a diagrammatic view of a structure illustrating the principle of operation of the invention.

FIGURE 2 is a side elevational view in partial section of one embodiment of the invention.

FIGURE 3 is a cross-sectional view of FIGURE 2 taken along the line 3—3 thereof.

FIGURE 4 is a perspective view of another embodiment of the invention.

FIGURE 5 is a perspective view of still another embodiment of the invention.

FIGURE 6 is a cross-sectional view of a storage battery cell showing an indicator in accordance with the invention mounted therein.

FIGURES 7 and 8 are enlarged fragmentary views of the indicator of FIGURE 6 showing the circulation of electrolyte through the indicator.

Before discussing the specific embodiments of the invention, reference is made to the structure shown in FIGURE 1 which illustrates the principle of operation of the invention. The floating body consists of an element A having a specific gravity $\rho_a$ and an element B having a specific gravity $\rho_b$. These elements are joined one to the other and supported for rotation about the point P. Let it be assumed that the center of gravity of the element A is at the point $G_a$ which is at a distance $l_a$ from the point P. It is also assumed that the volume of the element A is $V_a$. Then, if the volume of element B is $V_b$ and the center of gravity is located at $G_b$ which is a distance $l_b$ from the pivot point P, then the relationship between the specific gravity of the electrolyte being measured and the angle $\theta$ formed between a perpendicular and the line $G_aP$ is as follows:

$$\angle G_a \cdot P \cdot G_b = \alpha \qquad (1)$$

The rotational moment about the pivot P due to the buoyancy of element $G_a$ is $$V_a(\rho - \rho_a)l_a \sin \theta \qquad (2)$$

The rotational moment of the element B about the pivot P due to buoyancy of $G_b$ is $$V_a(\rho - \rho_b)l_b \sin (\theta + \alpha) \qquad (3)$$

When the foregoing rotational moments are balanced, that is, when their sum is equal to zero and the elements are at rest, the following equation obtains:

$$V_a(\rho - \rho_a)l_a \sin \theta + V_b(\rho - \rho_b)l_b \sin (\theta + \alpha) = 0 \qquad (4)$$

In the above equation, $V_a$, $V_b$, $\rho_a$, $\rho_b$, $l_a$, $l_b$, and $\alpha$ are constant, and, therefore, a fixed relationship exists between $\rho$ and $\theta$ so that the measurement of $\theta$ will afford a direct indication of the specific gravity $\rho$ of the electrolyte.

Referring now to the embodiment if the invention shown in FIGURES 2 and 3, the floating or movable body is denoted by the numeral 10 which may be made, for instance, of a substance such as polystyrene having a specific gravity of 1.08. This would correspond to the element A of FIGURE 1. An insert 11 of lead is affixed to the movable element 10 and this would correspond to the element B of FIGURE 1. The floating body or indicating element 10 is provided at one end with a pair of outwardly extending pivots or trunnions 12 which engage a pair of recesses 13 carried by the frame 14. The frame includes a back plate 15, a somewhat smaller front plate 16 and a plurality of legs 17 joining the two plates. With this arrangement, the element 10 is free to rotate about an axis through the pivots 12. The back plate 15 is provided with a suitable specific gravity scale 18, and the left portion of the movable element 10 is pointed as indicated at 10' or otherwise provided with a suitable marker to afford a convenient mode of reading specific gravity.

Inasmuch as the specific gravity of lead is 11.3 which is substantially greater than that of polystyrene, then, if a range of specific gravities of 1.10 to 1.30 is to be measured and the weight of the lead is $V_b \rho_b$ ($b$ represents the lead insert 11 and $a$ represents the polystyrene element 10) Equation 4 can be written as follows:

$$V_a(\rho - \rho_a) l_a \sin \theta \approx W_b l_b \sin (\theta + \alpha) \quad (5)$$

Accordingly, $$\rho = \frac{W_b l_b}{V_a l_a} \frac{\sin (\theta + \alpha)}{\sin \theta} + \rho_a \quad (6)$$

and $$\rho = R_1 \cot \theta + R_2 \quad (7)$$

wherein $$R_1 = \frac{W_b l_b}{V_a l_a} \sin \alpha \quad (8)$$

$$R_2 = \frac{W_b l_b}{V_a l_a} \cos \alpha + \rho_a \quad (9)$$

In view of the foregoing equations, it is evident that when the angle $\alpha$ is in the vicinity of 90°, the relationship between specific gravity and the angle $\theta$ becomes linear and therefore the scale 18 can also be linear.

When a device in accordance with the invention is permanently installed in the cell of a storage battery, the bubbles produce from the surface of the plates during charging and use of the battery rise to the surface and adherence of such bubbles to the element 10 of FIGURE 1, for instance, would produce an erroneous indication. To avoid this difficulty, a structure such as that illustrated in FIGURE 4 may be utilized. In this embodiment of the invention, the movable indicator or body 19 which is in a diamond configuration is contained within a housing of acid proof material generally denoted by the numeral 20. This housing has a back wall 21 and four side walls 22, 23, 24 and 25. The front of the housing 20 would be closed by a transparent surface of the battery cell in which the device is immersed. The movable element 19 is pivoted at 26 between the rear wall 21 and a front plate 27, the pivot being substantially the same as that illustrated and described in connection with the structure shown in FIGURE 2. The upper and lower corners of the body 20 are provided with liquid circulating openings 28 and 29 to minimize the entry of bubbles within the housing 20. In addition, the two lower corners of the housing include box-like structures 30, each having openings 31 and 32 therein and a filter material 33 such as glass wool or the like. This permits electrolyte to circulate through the housing and yet will prevent the flow of gas bubbles therethrough.

The buoyant element 19 may, of course, assume any desired configuration. In addition to the diamond configuration, it may be triangular, round, eliptical or the like. Furthermore, the surface of the element 19 or the element of FIGURE 2 may be treated with an activating agent such as polyethylene glycol or the like so that even if bubbles do contact the movable element they will rise along the lower inclined surface without adhering thereto. If desired, vented corner elements 30' may be employed on the upper corners of the housing as illustrated and the rear wall of the housing would include a suitable scale 34.

The structure shown in FIGURE 5 is substantially identical to the structure shown and described in connection with FIGURE 4 and like elements in the two figures have been denoted by like numerals. In FIGURE 5, however, a surrounding enclosure is not employed and therefore the front plate denoted herein by the numeral 27' is secured to the back plate 21' by spacing elements 35.

When the device in accordance with the invention is installed in a storage battery at the time of the manufacture of the battery and the battery must be shipped in dry form to the ultimate user, vibration and shock imparted to the battery may possibly damage or otherwise adversely affect the indicator in accordance with the invention. In order to avoid this difficulty, the movable element, such as 10 in FIGURE 3 and 19 in FIGURES 4 and 5, is preferably fixed in position so that it will not be jarred and result in damage to the pivots. This is accomplished in the case of FIGURE 3 by packing a gelatinous material 36 in and about the pivot or fulcrum of the movable element at the time the battery is being manufactured. While any suitable material may be employed for this purpose, it is important that the material be soluble in the battery electrolyte and at the same time not adversely affect the electrolyte in any way. Many such substances are known and available that will attain this end. If desired, the movable element may be secured in position by threads 37 as illustrated in FIGURE 5 which are also soluble in the battery electrolyte without adversely affecting the action of the electrolyte. In the case of sulphuric acid, a fibre material selected from a group consisting of polyamide series fibres, vinyl formal series fibres and cellulose series fibres have been found most satisfactory. With this arrangement, the movable element of the indicator is effectively held in position until the battery acid or other electrolyte is inserted. When the acid comes in contact with the gelatinous material or thread, as the case may be, the material is automatically dissolved and frees the movable element of the indicator to provide an indication of specific gravity.

FIGURES 6, 7 and 8 show the application of a structure such as that illustrated in FIGURE 4 to a storage battery. The battery is generally denoted by the numeral 38 and is provided with an outer housing 39, conventional plates 40 and electric terminals 41 and 42. The battery or cell is also provided with an access opening 43 in the usual manner. In the specific illustration, the case 39 of the battery or cell 38 is made of a transparent material and the indicator 20 is mounted on one wall thereof so that it is visible through the wall of the battery.

FIGURE 7 illustrates the flow of electrolyte through the indicator which prevents gas bubbles from reaching the movable element 19 and adversely affecting the reading.

FIGURE 8 illustrates the reverse flow of electrolyte through the indicator, but, in this instances, gas bubbles would not present any difficulty as they cannot flow downwardly in the direction of the arrows as shown.

By reason of the fact that the electrolyte circulates freely through the indicator, an accurate indication of the specific gravity of the electrolyte will be provided at all times and without the need for jarring or moving the battery to insure proper function of the indicator.

While only certain embodiments of the invention have been illustrated and described, it is apparent that alterations, modifications and changes may be made without departing from the true scope and spirit thereof as defined by the appended claim.

What is claimed is:

A device for indicating specific gravity of a liquid in a container comprising a complete enclosure having at least one transparent surface for viewing the interior thereof, a floating body within said enclosure, means carried by said enclosure for pivotally supporting said floating body and means carried by said frame and associated with said floating body to indicate specific gravity of the liquid in which said device is immersed, said container having relatively small top and bottom openings for the circulation of liquid therethrough, said floating body being formed of one material having a specific gravity less than that of the liquid and pivoted at one end to said container with the center of gravity of said one material being disposed between the ends thereof, said body being movable from a position inclined downwardly from a horizontal line through said pivot to a position inclined upwardly from said line, and a piece of another material carried by said body with the center of gravity thereof being below and vertically aligned with the center of gravity of the first said material with the body being disposed in a horizontal position, said other material having a specific gravity greater than the maximum specific gravity of the liquid being tested.

References Cited

UNITED STATES PATENTS

| | | | |
|---|---|---|---|
| 1,982,932 | 12/1934 | Scribner | 206—46 |
| 2,054,691 | 9/1936 | Browne | 73—454 |
| 2,072,164 | 3/1937 | Eurich | 73—454 |
| 2,072,553 | 3/1937 | Graves et al. | 73—454 |
| 2,285,586 | 6/1942 | Kerr | 73—454 |
| 2,439,865 | 4/1948 | Roberts | 28—76 |
| 2,575,008 | 11/1951 | Dorgin | 28—76 |
| 2,716,049 | 8/1955 | Latour | 28—76 |
| 3,160,950 | 12/1964 | O'Sullivan et al. | 29—423 |

JAMES J. GILL, *Primary Examiner.*

RICHARD C. QUEISSER, *Examiner.*

J. FISHER, J. D. SCHNEIDER, *Assistant Examiners.*